United States Patent [19]

Cohn

[11] 3,760,304

[45] Sept. 18, 1973

[54] SLOT LINE

[75] Inventor: Seymour B. Cohn, Tarzana, Calif.

[73] Assignee: The United States of America as represented by the Secretary of the Army, Washington, D.C.

[22] Filed: May 4, 1972

[21] Appl. No.: 250,457

Related U.S. Application Data

[62] Division of Ser. No. 826,314, May 21, 1969, Pat. No. 3,688,225.

[52] U.S. Cl. ................ 333/73 R, 333/73 S, 333/82, 333/84 R

[51] Int. Cl. ........................... H03h 7/04, H03h 7/08

[58] Field of Search .............. 333/70 S, 73 S, 84 R, 333/84 M, 82, 83

[56] References Cited

UNITED STATES PATENTS 2,976,499 3/1961 Sferrazza ............................ 333/10

3,243,742 3/1966 Fletcher ............................ 333/82

*Primary Examiner*—Rudolph V. Rolinec

*Assistant Examiner*—Marvin Nussbaum

*Attorney*—Harry M. Saragovitz et al.

[57] ABSTRACT

This invention relates to a low loss transmission line having a slotted metal deposited or etched on a high permittivity substrate. With various sizes, shapes and configurations of slots, the transmission line may be used as part of components such as hybrid junctions, couplers, filters, mixers, amplifiers, ferrite devices, and resonators. Novel slot/coax and slot/stripline junctions or connections are disclosed as well as novel methods of slot excitation.

2 Claims, 16 Drawing Figures

Patented Sept. 18, 1973 3,760,304
2 Sheets-Sheet 1
FIG. 1-A
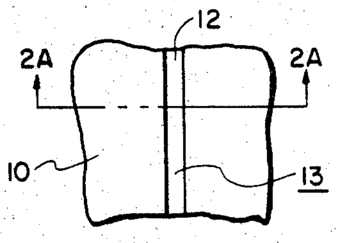
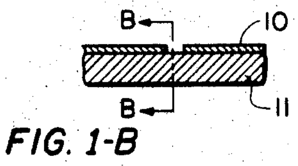
FIG. 1-B
FIG. 2-A
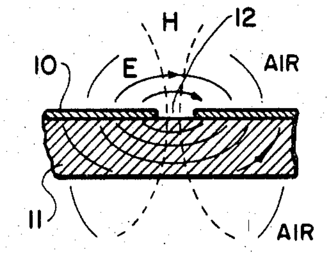
FIG. 2-B
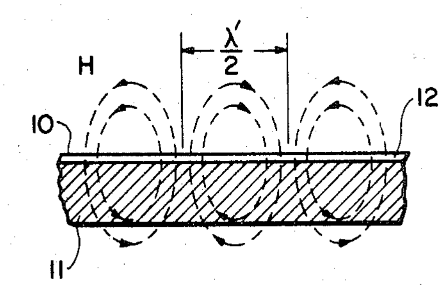
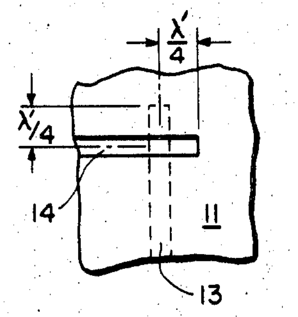
FIG. 3
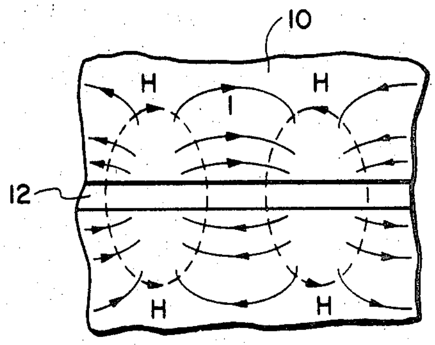
FIG. 2-C
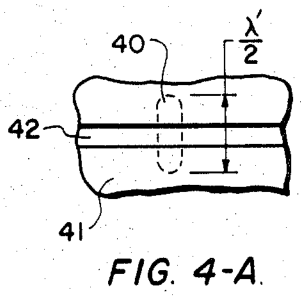
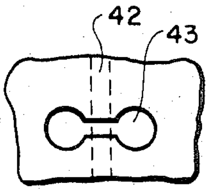
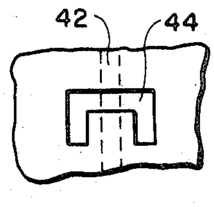
FIG. 4-A. FIG. 4-B FIG. 4-C

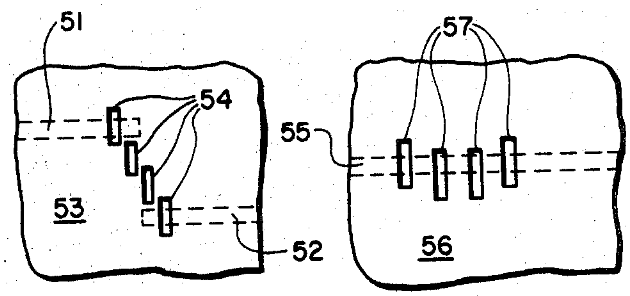
FIG. 5-A, FIG. 5-B
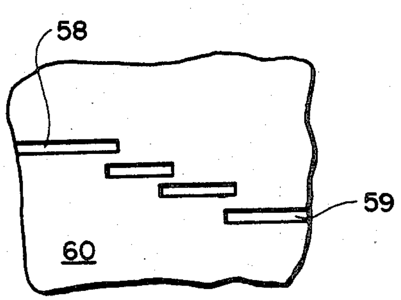
FIG. 5-C
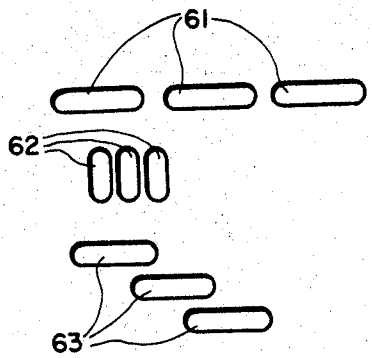
FIG. 6-A
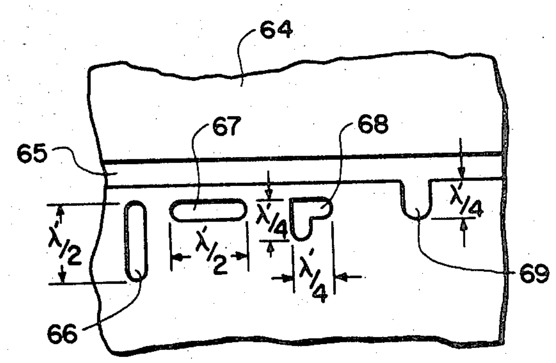
FIG. 6-B
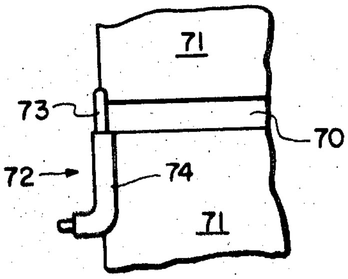
FIG. 7-A
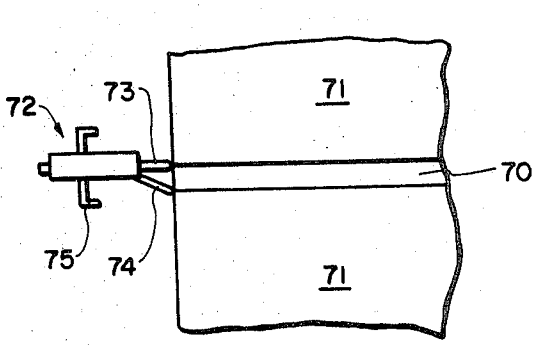
FIG. 7-B

SLOT LINE

This is a division of application Ser. No. 826,314, filed May 21, 1969, now U.S. Pat. No. 3,688,225.

BACKGROUND AND SUMMARY OF THE INVENTION

Microstrip transmission lines and integrated circuitry on a dielectric substrate have been widely used in the past. An alternative to the use of such microstrips is the use of a narrow slot or gap in the conductive coating on one side of the substrate with the other side of the substrate being exposed directly to air. The use of the slot line or gap formed in a metal coated dielectric substrate finds particular application in such areas as junctions, couplers, filters, resonators and ferrite devices.

Propogating slots in thin conductive sheets have had extensive use as radiating elements in microwave antennas. For the slot line herein disclosed to be practical as a transmission line, however, radiation must be minimized. This is accomplished through the use of a high permittivity substrate which causes the slot-mode wavelength, $\lambda'$, to be small compared to the free-space wavelength, $\lambda$, and thereby results in the fields being closely confined to the slot with negligible radiation loss.

The basic electrical parameters of a slot line are the characteristic impedance $Z_o$ and the phase velocity $v$. Relative velocity and wavelength are $v/c = \lambda'/\lambda$, where c is velocity of light, $\lambda'$ is slot-line wavelength, and $\lambda$ is free-space wavelength. Because of the non-TEM nature of the slot-line mode, these relative parameters are not constant, but vary with frequency at a rather slow rate per octave. This behavior contrasts with quasi-TEM microstrip line, whose $Z_o$ and $v/c$ are very nearly independent of frequency from dc to the highest frequency of ordinary interest. On the other hand, slot line differs from waveguide in that it has no cutoff frequency. Propagation along the slot occurs at all frequencies down to $f = 0$, where, if the metal-coated substrate is assumed infinite in length and width, $v/c$ approaches unity and $Z_o$ approaches zero. Other important parameters are the ratio of phase velocity to group velocity $v/v_g$, the effect of adjacent walls on the basic parameters, and the minimum allowable spacing of such walls from the slot for negligible effect.

In its simplest form, the slot line herein disclosed comprises of a slot or gap in a metal that is etched or deposited on a high permittivity substrate with the other side of the substrate being exposed to air. Various configurations of the slots may be employed either above or in conjunction with a microstrip to form components such as junctions, filters, resonators, etc.

A voltage difference exists across the slot edges, the electric field extends across the slot, and the magnetic field is perpendicular to the slot. Because the voltage occurs across the slot, the configuration is especially adapted for connecting shunt elements such as diodes, resistors, capacitors, transistors and resistive films.

Because of the ease of obtaining weak or strong coupling between the slot line and the microstrip line placed on opposite sides of the substrate, combinations of both kinds of lines offer design possibilities well beyond that of the microstrip by itself.

The slot line may be coupled to a microstrip or coax by novel methods hereafter disclosed.

Lengths of slot line on a high permittivity substrate may be used as low loss high Q resonators. These high Q resonators may be coupled to each other and to transmission slot lines and microstrip lines to comprise all of the possible kinds of filters, eg, band pass, band stop, directional, diplexers, multiplexers, etc.

Additional advantages of the slot line compared to prior art microstrip and shielded strip lines are the strongly elliptical polarized magnetic field in the air and substrate regions near the slot offering numerous possibilities of nonreciprocal ferrite device applications when ferrite material is used as the substrate, inserted in the substrate, or placed in nearby air regions.

BRIEF DESCRIPTION OF THE DRAWING

The exact nature of the invention will be readily apparent from consideration of the following specification relating to the annexed drawings in which:

FIGS. 1A and 1B show a slot line on a dielectric substrate.

FIGS. 2A, 2B, and 2C show the field and current distribution.

FIG. 3 shows a simple transition between slot line and microstrip.

FIGS. 4A, 4B, and 4C show various shaped resonant slots.

FIGS. 5A, 5B, and 5C show various filter configurations.

FIGS. 6A and 6B show various coupling configurations.

FIGS. 7A and 7B show various methods of obtaining a broadband transition between slot line and coaxial line.

DESCRIPTION OF THE PREFERRED EMBODIMENT

Referring now to the drawings there is shown in FIG. 1 the basic concept of the instant invention with a conductive metal coating 10 being deposited on a high permittivity substrate 11. Slot 12 is formed in said metal coating 10 by any suitable manner, including etching, thereby producing slot line 13.

There is shown in FIG. 2A the field distribution in cross-section, that is, across the slot line 13 as shown by line A—A of FIG. 1. It can be seen that the electric field E extends across the slot 12 while the magnetic field H extends perpendicular to the slot 12. Because the voltage occurs across the slot 12, this configuration is especially convenient for connecting shunt elements. There is shown in FIG. 2B the H or magnetic field in longitudinal cross-section across slot 12 and taken along line B—B of FIG. 1. FIG. 2B shows that in the air regions, the magnetic field H curves and returns to the slot 12 at half-wavelength intervals. A propagating wave has elliptically polarized regions that can be usefully applied in creating ferrite components. FIG. 2C shows the current distribution I and magnetic field H on metal coating 10. The surface current density is greatest at the edges of slot 12 and decreases rapidly with distance from slot 12. It can easily be seen from FIGS. 2B and 2C that magnetic field H is elliptically polarized at all points.

There is shown in FIG. 3 the simple coupling between slot line 13, shown in dotted lines in FIG. 3, and microstrip line 14. When the two lines 13 and 14 are close to each other, coupling will exist and when they are far apart they will be independent, one from the other. If the slot line 13 is positioned perpendicular to the microstrip line 14, coupling will be especially tight and transition covering approximately 30 percent bandwidth can be achieved when the characteristic impedances of the strip 14 and slot line 13 are equal and when the strip 14 and slot line 13 are extended approximately one-quarter wavelength beyond the point of crossing. With matching techniques, a bandwidth of an octave or so should be feasible.

There is shown in FIG. 4A a half-wavelength elongated resonant slot 40 in dashed lines on the back side of substrate 41. Metal strip 42 is coupled to said slot 40 with the high permittivity of substrate 41 attenuating radiation from said slot 40. Other resonant slots shown in FIGS. 5B and 5C are made more compact by capacitively loading its center as shown by dumbbell-shaped slot 43 or by the bent slot 44 configuration shown in FIG. 5C. Metal strip 42 is shown as dashed lines in each of FIGS. 5B and 5C.

FIG. 5 shows various filter applications of the slot line. In particular, FIG. 5A shows a band pass filter arrangement with microstrip lines 51 and 52 being placed on the opposite side of metal coated substrate 53. Slots 54 are coupled to each other and to input and output strip lines 51 and 52 as shown. FIG. 5B illustrates a low insertion loss, band-stop filter with microstrip line 55 being placed on the opposite side of metal coated substrate 56. Slots 57 are formed so that the first and last slots are centered over the stripline 55 while the other slots 57 are offset from stripline 55 to vary the coupling. FIG. 5C shows a band-pass filter with input and output slots 58 and 59 formed onto metal coated substrate 60. It is clearly seen that various other bandpass and band-stop configurations are feasible using slots alone or slots with strips or opposite sides of the substrate.

There is shown in FIG. 6 various coupling configurations and in particular there is shown in FIG. 6A various coupling arrangements between resonant slots useful, generally, in a bandpass filter arrangement. There is shown in the upper part of FIG. 6A three slots 61 placed parallel end-to-end and providing relatively small coupling between such resonant slots 61. The placement of slots 62 parallel to each other and spaced apart provides a medium coupling while spacing slots 63 parallel, but offset, from each other provides for a relatively large coupling coefficient. FIG. 6B illustrates various coupling configurations of slot line to resonant slot with varying degrees of coupling useful generally in band-stop or band rejection.

Metal covered substrate 64 having slot line 65 is shown with varying degrees of coupling illustrated in slots 66,67,68 and 69. The low numbered slot 66 producing a relatively medium coupling, slot 67 producing a relatively weak coupling, bent slot 68 producing a relatively stronger coupling with slot 69 producing a very strong coupling. Lengths of the various slots are as shown in the figure. It should be apparent also that resonant slots or slot lines might be coupled to resonant strips or striplines (not shown) having the same general configuration as the illustrated slots and slot lines.

There is shown in FIG. 7 two techniques of exciting the slot line or obtaining a broad band transition between the slot line and a coaxial line. In FIG. 7A there is shown a slot 70 formed on metal covered substrate 71 and with coaxial line 72. Center conductor 73 is electrically connected to one side of the slot 70 while the outer conductor 74 is electrically connected to the other side of slot 70. Such connections of center conductor 73 and outer conductor 74 may be made by any suitable means including solder or conductive epoxy. The coaxial line 72 parallels the edge of substrate for a distance to where the slot line current is negligible and then bent away from substrate 71 as shown. An alternative method of exciting the slot line 70 is shown in FIG. 7B where the center conductor 73 is electrically connected to one side of the slot 70 while the outer conductor is electrically connected to the other side of slot 70. To avoid leakage, a quarter wave-length short circuited choke 75 is employed concentric with coax 72 providing a high impedance on outer conductor 74 using well-known techniques. It should be noted that excitation may be provided in the form shown in FIG. 3.

It is to be understood that any high permittivity substrate may be employed and that the thickness of such substrate is generally less than $\lambda/4$ although greater thicknesses have been employed. The metal used heretofore has been copper or gold but any suitable metal may be employed. The thickness of the metal coating over the substrate has generally been 5–1 mil with the higher frequency utilizing a thinner metal thickness. The width of the slot may be varied depending upon such factors as impedance, wavelength, and frequency employed.

Various uses of the slot line and resonant slot may be apparent from the above disclosure including the use of resonant slots parallel to and on the opposite side of the substrate from a microstrip transmission line to increase the impedance of the line, it being noted that the slots and stripline would not be coupled unless offset one from the other. Further, the slots, stripline, or substrate may be constructed of a ferrite material to produce various ferrite devices including phase shifters, isolators, switches, and directional couplers. Sinusodial shaped slot and strip may be employed on opposite sides of a substrate, and offset by 90° from each other, to give various coupling arrangements.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. A filter arrangement comprising:

a high permittivity substrate having a first and a second side;

a metal layer in contact with and covering said first side of said substrate, said second side being exposed to air;

a series of elongated slots formed in said metal, said slots being offset one from the other in a steppingstone fashion; and, input and output means mounted on said first side of said substrate thereby couping said slots to produce a band-pass filter.

2. The filter arrangement according to claim 1 and further comprising that:

said input and output means comprises a slot line.

* * * * *

UNITED STATES PATENT OFFICE
CERTIFICATE OF CORRECTION

Patent No. 3,760,304 Dated 18 September 1973

Inventor(s) Seymour B. Cohn

It is certified that error appears in the above-identified patent and that said Letters Patent are hereby corrected as shown below:

Column 4, line 24, "5-1 mil" should read --0.5-1 mil--.

Signed and sealed this 30th day of April 1974.

(SEAL)
Attest:

EDWARD M.FLETCHER,JR.
Attesting Officer

C. MARSHALL DANN
Commissioner of Patents